(12) United States Patent
Boxwell et al.

(10) Patent No.: US 10,713,242 B2
(45) Date of Patent: *Jul. 14, 2020

(54) ENHANCING PERFORMANCE OF STRUCTURED LOOKUPS USING SET OPERATIONS

(71) Applicant: INTERNATIONAL BUSINESS MACHINES CORPORATION, Armonk, NY (US)

(72) Inventors: Stephen A. Boxwell, Columbus, OH (US); Octavian F. Filoti, Portsmouth, NJ (US); Nils R. Holzenberger, Paris (FR); Ashok T. Kumar, North Chelmsford, MA (US); Rafael A. Leano, Corvallis, OR (US); Cheyenne E. Parsley, Uneeda, WV (US)

(73) Assignee: International Business Machines Corporation, Armonk, NY (US)

( * ) Notice: Subject to any disclaimer, the term of this patent is extended or adjusted under 35 U.S.C. 154(b) by 501 days.

This patent is subject to a terminal disclaimer.

(21) Appl. No.: 15/627,181

(22) Filed: Jun. 19, 2017

(65) Prior Publication Data
US 2018/0204136 A1 Jul. 19, 2018

Related U.S. Application Data (63) Continuation of application No. 15/408,070, filed on Jan. 17, 2017.

(51) Int. Cl.
*G06F 16/00* (2019.01)
*G06F 16/2452* (2019.01)
(Continued)

(52) U.S. Cl.
CPC ...... *G06F 16/24522* (2019.01); *G06F 16/248* (2019.01); *G06F 16/2455* (2019.01); *G06F 16/3329* (2019.01); *G06F 16/3344* (2019.01); *G06F 40/30* (2020.01); *G06N 3/006* (2013.01); *G06N 5/04* (2013.01); *G06N 20/00* (2019.01)

(58) Field of Classification Search
None
See application file for complete search history.

(56) References Cited

U.S. PATENT DOCUMENTS 6,560,590 B1 * 5/2003 Shwe ............... G06F 16/951 706/55
6,675,159 B1 * 1/2004 Lin .................. G06F 17/2705
(Continued)

FOREIGN PATENT DOCUMENTS

CN 103955525 A1 7/2014
WO WO 2015/135455 A1 9/2015

OTHER PUBLICATIONS

Vanessa Lopez, Andriy Nikolov, Miriam Fernandez, Marta Sabou, Victoria Uren, and Enrico Motta, "Merging and Ranking Answers in the Semantic Web: The Wisdom of Crowds", Springer-Verlag Berlin Heidelberg 2009 (Year: 2009) (Year: 2009).*

(Continued)

*Primary Examiner* — Polina G Peach
(74) *Attorney, Agent, or Firm* — Conley Rose, P.C.

(57) ABSTRACT

A computer-implemented method configured to train a system to be able to provide answers to questions that do not have a direct relationship established in a database.

12 Claims, 4 Drawing Sheets

(51) Int. Cl.
*G06N 20/00* (2019.01)
*G06F 16/248* (2019.01)
*G06F 16/2455* (2019.01)
*G06F 16/332* (2019.01)
*G06F 16/33* (2019.01)
*G06N 5/04* (2006.01)
*G06F 40/30* (2020.01)
*G06N 3/00* (2006.01)
*G06F 16/30* (2019.01)

(56) References Cited

U.S. PATENT DOCUMENTS

| | | |
|---|---|---|
| 7,209,923 B1 | 4/2007 | Cooper |
| 7,792,829 B2 | 9/2010 | Brill et al. |
| 7,962,474 B2 | 6/2011 | Lindblad et al. |
| 8,055,675 B2 | 11/2011 | Higgins et al. |
| 8,423,576 B2 | 4/2013 | Drissi et al. |
| 8,566,343 B2 | 10/2013 | Baby et al. |
| 8,682,647 B1 | 3/2014 | Lee |
| 8,732,156 B2 | 5/2014 | Averett et al. |
| 9,037,580 B2 | 5/2015 | Brown et al. |
| 9,092,484 B1 * | 7/2015 | Abraham ........... G06F 16/24542 |
| 9,110,882 B2 * | 8/2015 | Overell ................ G06F 40/30 |
| 9,146,918 B2 | 9/2015 | Ashparie et al. |
| 10,162,853 B2 * | 12/2018 | Venkataraman ........ G10L 15/22 |
| 2002/0169595 A1 * | 11/2002 | Agichtein ............. G06F 40/205 704/9 |
| 2004/0243568 A1 * | 12/2004 | Wang .................... G06F 16/313 |
| 2005/0027717 A1 * | 2/2005 | Koudas ............... G06F 16/3347 |
| 2006/0074980 A1 * | 4/2006 | Sarkar .................. G06F 16/958 |
| 2007/0122792 A1 * | 5/2007 | Galley .................... G09B 7/02 434/353 |
| 2007/0136246 A1 * | 6/2007 | Stenchikova ......... G06F 16/243 |
| 2007/0196804 A1 * | 8/2007 | Yoshimura ............ G09B 7/02 434/323 |
| 2009/0070322 A1 | 3/2009 | Slavetti et al. |
| 2012/0077178 A1 * | 3/2012 | Bagchi ..................... G09B 7/00 434/362 |
| 2012/0078636 A1 * | 3/2012 | Ferrucci .............. G06F 16/3329 704/270.1 |
| 2012/0078888 A1 * | 3/2012 | Brown ................ G06F 16/3329 707/723 |
| 2013/0226846 A1 * | 8/2013 | Li .......................... G06N 20/00 706/12 |
| 2013/0246046 A1 * | 9/2013 | Fan ........................ G06F 40/30 704/9 |
| 2014/0272884 A1 * | 9/2014 | Allen .................... G06N 20/00 434/322 |
| 2014/0324395 A1 * | 10/2014 | Silverman ................ G06N 5/04 703/1 |
| 2014/0358890 A1 | 12/2014 | Chen et al. |
| 2014/0370480 A1 * | 12/2014 | Sugibuchi ................ G09B 7/02 434/322 |
| 2015/0161230 A1 * | 6/2015 | Alkov .................... G06F 16/35 707/737 |
| 2015/0254244 A1 | 9/2015 | Chu-Carroll et al. |
| 2015/0269139 A1 * | 9/2015 | McAteer ............. G06F 17/2785 704/9 |
| 2016/0055212 A1 | 2/2016 | Young et al. |
| 2016/0155058 A1 * | 6/2016 | Oh ........................ G06N 20/00 706/11 |
| 2016/0180217 A1 | 6/2016 | Boston et al. |
| 2017/0017635 A1 * | 1/2017 | Leliwa ..................... G06F 40/30 |
| 2017/0026705 A1 * | 1/2017 | Yeh ....................... G06F 16/7343 |
| 2017/0199928 A1 * | 7/2017 | Zhao .................. G06F 16/24578 |
| 2017/0228372 A1 * | 8/2017 | Moreno ............. G06F 16/24522 |
| 2018/0011830 A1 * | 1/2018 | Iida ......................... G06F 17/241 |
| 2018/0060422 A1 * | 3/2018 | Wegryn ................. G06F 16/243 |

OTHER PUBLICATIONS

Asunción Gómez-Pérez, YongYu, Ying Ding "The Semantic Web", pp. 135-152, Fourth Asian Conference, ASWC 2009, Shanghai, China, Dec. 6-9, 2009 (Year: 2009).*

Hoang et al.; "L2S: Transforming Natural Language Questions Into SQL Queries", KSE Seventh IEEE International Conference on, Oct. 8-10, 2015, pp. 85-90.

Zou et al.; "Natural Language Question Answering Over RDF—A Graph Data Driven Approach", SIGMOD'14 ACM International Conference on, Jun. 22-27, 2014, pp. 313-324.

Tablan, et al., "A Natural Language Query Interface to Structured Information," ESWC '08 Proceedings of the 5th European Semantic Web Conference on the Semantic Web: Research and Applications, Tenerife, Canary Islands, Spain, Jun. 1-5, 2008, pp. 361-375.

"List of IBM Patents or Applications Treated as Related," dated Jun. 19, 2017, 2 pages.

Office Action dated Dec. 4, 2019; U.S. Appl. No. 15/408,070, filed Jan. 17, 2017, 16 pages.

* cited by examiner

ENHANCING PERFORMANCE OF STRUCTURED LOOKUPS USING SET OPERATIONS

BACKGROUND

The present disclosure relates to the field of natural language processing, information retrieval, and machine learning technologies.

Question Answering (QA) systems are designed to automatically answer questions posed by humans in a natural language using natural language processing (NLP) and a knowledge base that contains structured and unstructured information. One example of a QA system is Watson® developed by International Business Machines Corporation (IBM®).

SUMMARY

The disclosed embodiments include a computer-implemented method for providing answers to questions that do not have a direct relationship established in a database. In one embodiment, the computer-implemented method includes the step of receiving a training question and a training answer set to the training question. The computer-implemented method determines a training question structure of the training question and determines a training subject in the training question. The computer-implemented method then determines a plurality of paths in a database that links the training subject to a plurality of answer subsets. Each of the answer subsets includes at least one answer in the training answer set to the training question. The computer-implemented method performs a relation scoring analysis on the plurality of answer subsets to determine the answer subset or a combination of the answer subsets that provides a highest accuracy score. In one embodiment, the relation scoring analysis is configured to perform an operation on the combination of the answer subsets based on a precision and a recall of the answer subsets in comparison to the training answer set to the training question. The computer-implemented method stores a subset of the plurality of paths corresponding to the answer subset or the combination of the answer subsets having the highest accuracy score. In an embodiment, the computer-implemented method also stores the operation performed on the combination of the answer subsets having the highest accuracy score, and the training question structure of the training question for use in providing answers to questions that do not have a direct relationship established in the database.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As referenced herein, the term database or knowledge base is defined as collection of structured or unstructured data. Although referred in the singular form, the database may include one or more databases, and may be locally stored on a system or may be operatively coupled to a system via a local or remote network. The term subset as used herein is defined a set containing one or more elements of a larger set.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise. Additionally, unless otherwise specified, any use of any form of the terms "connect," "engage," "couple," "attach," "communicate," or any other term describing an interaction between elements is not meant to limit the interaction to direct interaction between the elements and may also include indirect interaction between the elements described.

Extracting information from a database to answer complex natural language questions is not a trivial task. So far, attempts have been made to find answers in a database by looking at the individual rows, and matching concepts according to the columns. The inventors recognized that as questions get more complex, there is additional information in a database that can be extracted if queries are combined and multiple rows are considered to answer these questions.

Accordingly, disclosed herein are embodiments that apply an innovative approach in how a database is queried to provide answers to complex natural language questions. For example, the disclosed embodiments enable queries to be combined in different ways (e.g. union, intersection, aggregation) to obtain information that is present in the database, but not explicitly written. The resulting relations can be scored, rated, and used to improve natural language query results. This would allow a system to build answers in a similar way to how humans do, and for example, answer questions such as: find the total export volume of a given country (requires summing up the volumes of exports to all other countries), finding the continents that it has exported to (requires looking for distinct values across rows), or finding how many countries have been exported to (requires combining information from select rows).

Figure 1:
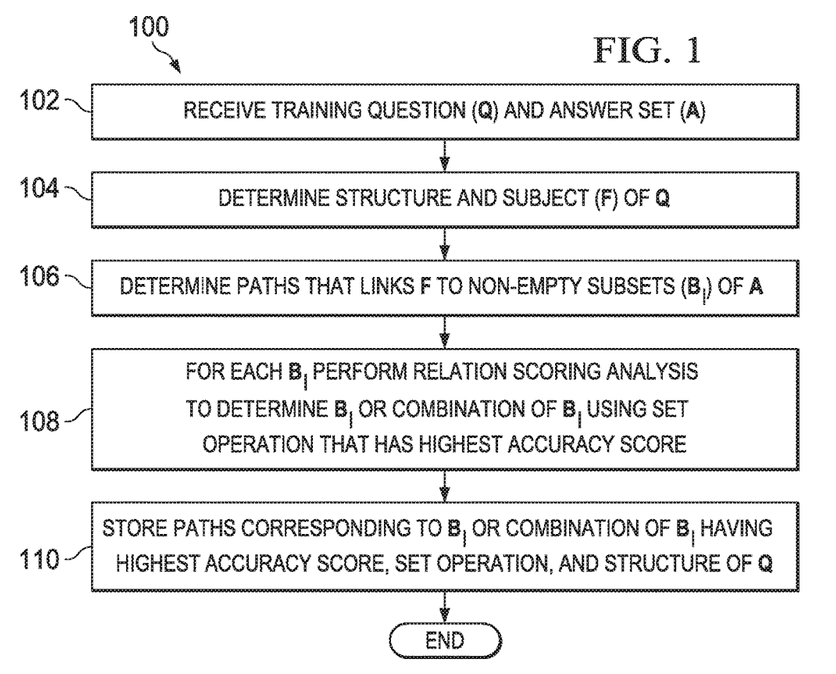
FIG. 1 is a flowchart of a computer-implemented method for training a system to enable the system to answer a question according to an embodiment of the present disclosure.

Turning now to FIG. 1, a flowchart is presented that depicts a computer-implemented method 100 for training a system to enable the system to answer a question that does not have a direct question-answer relationship established in a database according to an embodiment of the present disclosure. In one embodiment, the database comprises resource development framework (RDF) triples (also known as a triplestore or RDF store). RDF is a part of the World Wide Web Consortium (W3C) Semantic Web Activity and is a framework for describing resources such as the content of a web site using triples. An RDF triple is so named because they follow a subject-predicate-object structure. The subject denotes the resource, and the predicate denotes traits or aspects of the resource and expresses a relationship between the subject and the object. The RDF database is a special purpose database designed for the storage and retrieval of triples through semantic queries. The RDF database may be queried using a semantic query language such as, but not limited to, SPARQL (a recursive acronym for SPARQL Protocol and RDF Query Language).

The method 100 begins at step 102 by receiving a training question and a training answer set to the training question. The training question and training answer set may be received directly through user input or from another system. At step 104, the method 100 determines a structure and subject of the training question. For instance, in one embodiment, the method 100 parses the training question into different keywords and sentence fragments in order to find statistically related phrases and to determine the context of the training question. The method 100 may add or replace particular phrases or words with related synonyms to identify related phrases. For example, the method 100 may determine that the questions "Who was the last emperor of ancient Rome?," "Who was the last ruler of ancient Rome?," and "Who was the last leader of ancient Rome?" are all equivalent questions. Based on the structure of the training question and keywords in the training/equivalent questions, the method 100 is able to determine the subject or focus of the training question.

At step 106, the method 100 determines paths in the database that links the training subject to a plurality of answer subsets that includes at least one answer in the training answer set to the training question. As a non-limiting example, assume a database contains, among other facts, the capitals of the countries of the world, in the form of a path called has_capital linking countries to their capital cities. Assume the training question is "What is the capital of France?" and the answer is Paris. The method 100 queries the database for a path linking France to Paris, and finds the path has_capital and perhaps other paths as well. For each of these paths, as will be described in detail below with respect to FIGS. 2A and 2B, the method 100 determines the entities/ answer subsets that can be retrieved through them and performs a relation scoring analysis to determine the answer subset or a combination of the answer subsets that provides a highest accuracy score. In one embodiment, the accuracy score is an F-score, which is a measure of accuracy based on the precision and recall of the answer subset or a combination of the answer subsets with respect to the training answer set of the training question. The combination of the answer subsets may be an answer subset that is generated by the union or the intersection of two different answer subsets. Recall is the number of relevant items in an answer subset or combination of the answer subsets over the total relevant item in the training answer set. Precision is the number of items in the answer subset or combination of the answer subsets that are relevant (i.e., that are in the training answer set) over the number of items in the answer subset or combination of the answer subsets. In other words, recall is how many relevant items are selected, and precision is how many selected items are relevant.

At step 110, the method 100 stores the path(s) corresponding to the answer subset or combination of the answer subsets that provide the highest accuracy score along with the structure of the training question and any operation (e.g. union, intersection, aggregation) performed on the combination of the answer subsets, which can then be used to answer similar questions. For instance, using the above capital_of example, the method 100 may store the structure of the question as "What is the capital of [ . . . ]?" and the path that provides the answer is the path has_capital. Thus, as will be further described in detail below with respect to FIG. 3, when asked a new question, such as "What is the capital of Germany?," the system is able to match the structure of the new question with the structure of the stored training question and will use the corresponding stored path has_capital to retrieve the answer "Berlin" corresponding to the subject (i.e., Germany) of the new question.

To truly understand the benefits of the disclosed embodiments, a better example is one that in which the answer to a question is a set of answers. For example, assume the training question is "Who are the business partners of the United States of America (USA)?" The answer to the training question is made up of the export partner countries and the import partner countries of the USA. The database that is being used does not have a path (e.g., business_partner) that directly identifies the business partners of a country. However, the database has paths export_partner and import_ partner. These paths are determined by finding the paths that link USA to answer subsets of the training answer set and determining which of the answer subset(s) provide the highest accuracy score. In this example, the method 100 finds the answer subsets that can be retrieved through the paths export_partner and import_partner. As will be further described, because the answer subsets retrieved through the paths export_partner and import_partner each have a precision of 1 (1 equaling 100%) and a recall of less than 1, the method 100 will perform a union operation on the two answer subsets to generate a combined answer set. Union (∪) is defined as a set containing all distinct elements in the combination of the answer subsets. In other words, the union of two sets contains elements in the first set, the second set, and both the first and second set. The method 100 checks the combined answer set and determines that it matches the given list of answers, thus giving it an accuracy score of 1 or 100%. Thus, the method 100 can store the structure of this question "Who are the business partners of [ . . . ]?", the paths export_partner and import_partner, and the union operation for future use in answering similar questions. In alternative embodiments, the operation may not be stored, and the method 100 may determine at the time of answering a similar question the operation to perform on the retrieved answer subsets based on recall and precision of the answer subsets.

Similarly, depending on the question and answer subsets, the disclosed embodiments may perform an intersection on the answer subsets. Intersection (∩) is defined as a set containing all elements that are in all the combinations of the answer subsets. In other words, the intersection of two sets is a new set that contains all of the elements that are in both sets and only those elements that are in both sets. For example, supposed the training question is "What countries are both import and export partners of the USA?" and we are given the list of answers. The same method as described above is performed to discover the paths export_partner and import_partner and their corresponding answer subsets. However, because the answer subsets in relation to the list of answers to this particular training question has a precision of less than 1 and a recall of 1, the method 100 is configured to perform an intersection operation on the two answer subsets to generate a new answer subset containing the intersected elements of the two answer subsets. The method 100 compares the new answer subset to the list of answers and determines that the new answer subset has an accuracy score of 1. The method 100 stores the structure, paths, and optionally the operation for answering future questions matching the same question structure.

In addition to intersection and union, in some embodiments the method 100 may also be configured to provide a numerical answer by counting the number of elements in the result set of a table query. For example, instead of "What countries are both import and export partners of the USA?," the disclosed embodiment may be trained to answer the question "How many countries are both import and export partners of the USA?" by performing the above method 100 and then counting the number of elements in the answer set, and returning the count as the answer instead of the elements in the answer subset. Although the above examples only describe two paths and corresponding answer subsets, the disclosed embodiments are applicable to any number of paths and corresponding answer sets.

Figure 2A:
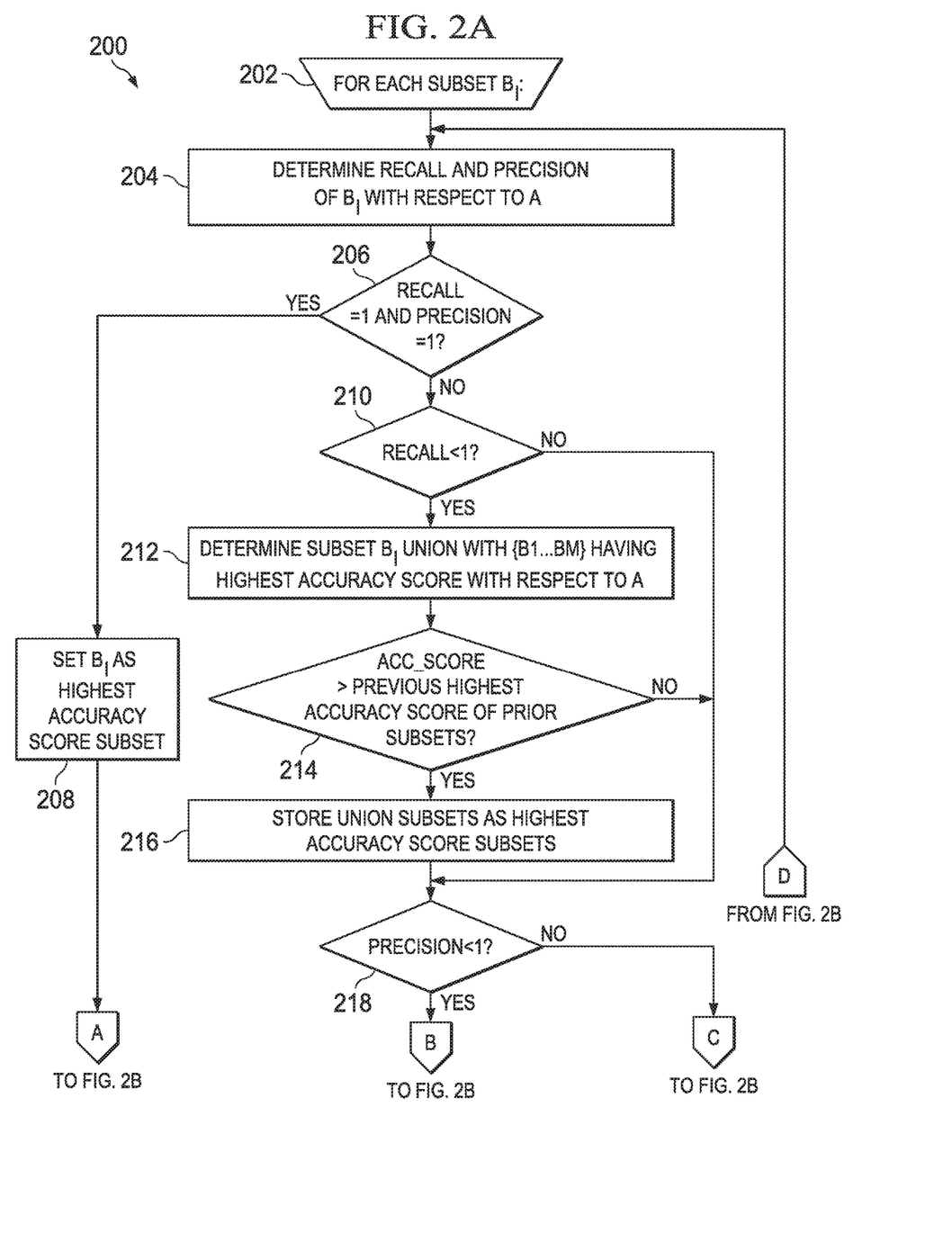
FIGS. 2A and 2B are a flowchart of a computer-implemented method for performing a relation scoring analysis to determine the answer subset(s) having a highest accuracy score with respect to a training question answer set according to an embodiment of the present disclosure.
Figure 2B:
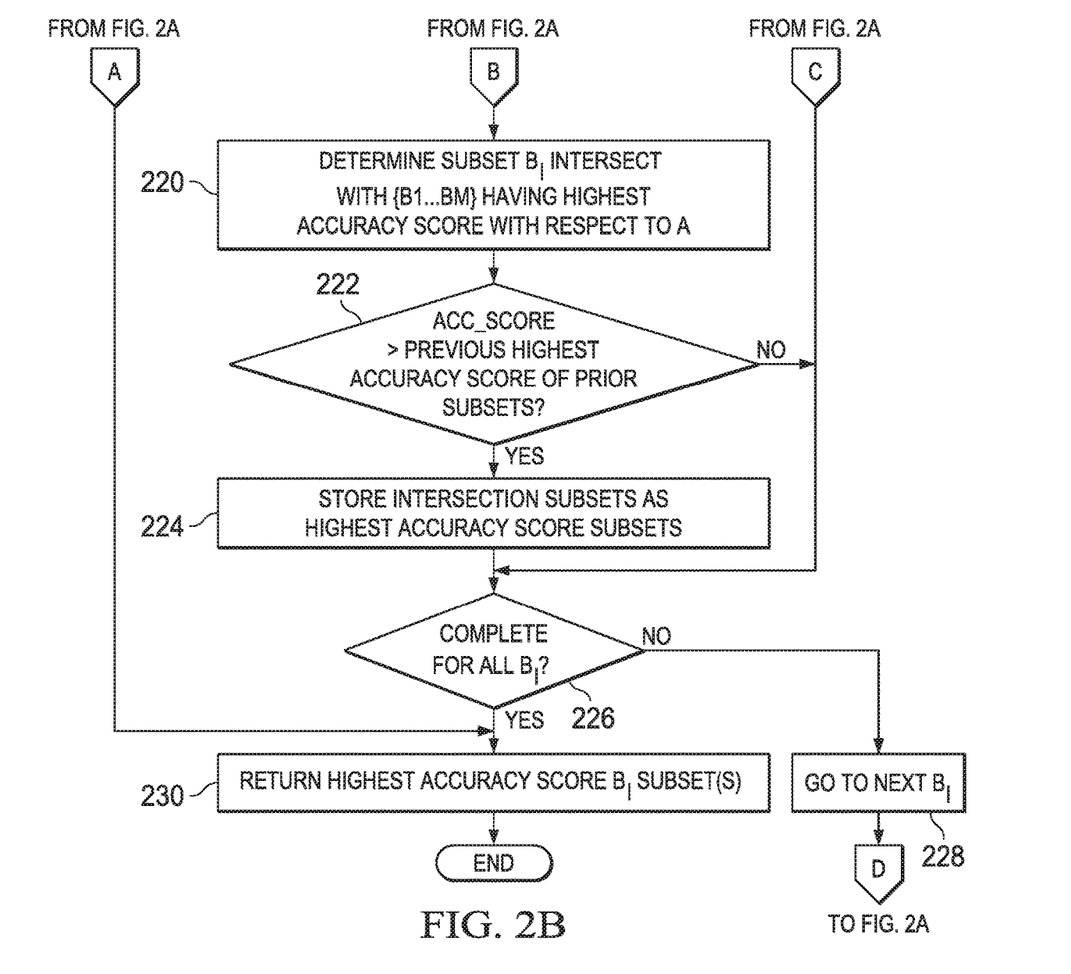

FIGS. 2A and 2B are a flowchart depicting a computer-implemented method 200 for performing a relation scoring analysis to determine an answer subset or combination of answer subsets that have a highest accuracy score with respect to a training question answer set (i.e., step 108 in FIG. 1) according to an embodiment of the present disclosure. In the depicted embodiment shown in FIGS. 2A and 2B, assume that the method 200 received a training question (Q) and a set of answers to the training question (A)={a_1, a_2, . . . a_n} as described in step 102 in FIG. 1. Also assume that F is the focus of Q, and that a database of RDF triples is queried to find paths p_1, p_2, . . . , p_m that each go from F to a non-empty answer subset of A as described in steps 104 and 106 in FIG. 1. These non-empty answer subset of A will be designated as {B_1, . . . B_m}. Based on the above assumptions, the method 200 begins at step 202 by executing a for-loop for each non-empty answer subset (Bi). Within the for-loop, the method 200 at step 204 determines the recall and precision of the answer subset Bi. At step 206, the method 200 determines whether both the recall and precision of Bi is equal to 1. If it is, this means that the answer subset Bi is a perfect match to the training question answer set. In this case, the method 200 at step 208 sets Bi as the answer subset having the highest accuracy score, returns this answer subset as the answer subset having the highest accuracy score at step 230, and the method 200 terminates thereafter.

However, if at step 206 Bi is not a perfect match to the training question answer set, the method 200 determines at step 210, if the recall of Bi is less than 1. If recall is not less than 1, the method 200 skips to step 218. However, if the recall of Bi is less than 1, the method 200 at step 212 determines a subset having the highest accuracy score with respect to the training question answer set by performing the union of Bi with each of the subsets in (B_1, . . . B_m). At step 214, the method 200 determines if the subset having the highest accuracy score of Bi∪(B_1, . . . B_m) has an accuracy score greater than a previously stored answer subsets' accuracy score, and if so, the method 200 at step 216 stores the answer subsets and optionally the set operation corresponding to the current Bi∪(B_1, . . . B_m) answer subset as the answer subsets that produce the highest accuracy score and proceeds to step 218. If the method 200 determines at step 214 that a previously stored answer subset(s) has a higher accuracy score than the current Bi∪(B_1, B_m) answer subset, then the method does not replace the stored answer subsets that produce the highest accuracy score and skips to step 218.

At step 218, the method 200 determines if the precision of Bi is less than 1. If precision is not less than 1, the method 200 skips to step 226. However, if the precision of Bi is less than, the method 200 at step 220 determines a subset having the highest accuracy score with respect to the training question answer set by performing the intersection of Bi with each of the subsets in (B_1, . . . B_m) and proceeds to step 222. Similar to above, at step 222 the method 200 determines if the subset having the highest accuracy score of Bi∩(B_1, . . . B_m) has an accuracy score greater than a previously stored answer subsets' accuracy score, and if so, the method 200 at step 224 stores the answer subsets and optionally the set operation corresponding to the current Bi∩(B_1, . . . B_m) answer subset as the answer subsets that produce the highest accuracy score and proceeds to step 226. If the method 200 determines at step 222 that a previously stored answer subset(s) has a higher accuracy score than the current Bi ∩(B_1, . . . B_m) answer subset, then the method 200 does not replace the stored answer subsets and skips to step 226. At step 226, the method 200 determines if all answer subset Bi have been processed. If there are answer subset(s) that have not been processed, the method 200 advances to the next answer subset (i.e., $B_{i+1}$) at step 228 and repeats the method 200 at step 204. In one embodiment, if the union or intersection of any pair of answer subsets yields an accuracy score of 1, the method 200 terminates and returns that pair of answer subsets.

Once all answer subsets Bi have been processed, or unless an exact match was found beforehand (i.e., either a single subset or pair of subsets yield an accuracy score of 1), the method 200 returns the stored answer subsets that produce the highest accuracy score at step 230, and optionally the set operation performed on the stored answer subsets to generate the answer set, and the method 200 terminates thereafter.

In some embodiments, instead of returning the stored answer subsets that produce the highest accuracy score, the method 200 may be configured to return the paths corresponding to the stored answer subsets that produce the highest accuracy score. Additionally, in some embodiments, the method 200 may continue despite finding a pair of answer subsets that yields an accuracy score of 1. For instance, in some embodiments, the method 200 may store all pair/paths that yield high accuracy scores or perfect accuracy scores to perform redundant queries to verify the accuracy of an answer. For instance, if multiple queries are performed using different paths, but yield the same or nearly the same results, then the system can accurately predict the reliability of the answer.

The pseudo code for the flow diagram depicted in FIGS. 2A and 2B is provided below: for each subset BI:

```
determine the recall and precision of BI with respect to A
if recall = 1 and precision = 1
  set BI as highest subset
  stop
else
  if recall < 1 then
    find the subset of {BI, B_M} whose union with BI has the highest accuracy score (e.g.,
    harmonic mean of precision and recall with respect to A)
    // harmonic mean is defined as the average of a set of numbers and is equal to the
number of elements divided by the sum of the reciprocals of the elements
      if accuracy score of subset > accuracy score of previous subsets
      set subset as highest subset
      store subset pair and/or corresponding paths (optionally set operation) that produce
the subset
    end if
    if precision < 1 then
      find the subset of {BI, B_M} whose intersection with BI has the highest accuracy
         score
      if accuracy score of subset > accuracy score of previous subsets
      set subset as highest subset
      store subset pair and/or corresponding paths (optionally set operation) that produce
      the subset
    end if
  end if
end for
return subset pair and/or corresponding paths (optionally set operation) that produce the subset
having the highest accuracy score
end
```

To further clarify the disclosed embodiments, the following examples are provided. The examples use a database that contains the following RDF triples (each numbered paragraph is an RDF triple).

<http://ibm.com/wikipedia/resource/United_States>
<http://ibm.com/wikipedia/property/import_source>
<http://ibm.com/wikipedia/resource/Canada>.
<http://ibm.com/wikipedia/resource/United_States>
<http://ibm.com/wikipedia/property/import_source>
<http://ibm.com/wikipedia/resource/China>.
<http://ibm.com/wikipedia/resource/United_States>
<http://ibm.com/wikipedia/property/import_source>
<http://ibm.com/wikipedia/resource/Mexico>.
<http://ibm.com/wikipedia/resource/United_States>
<http://ibm.com/wikipedia/property/export_market>
<http://ibm.com/wikipedia/resource/European_Union>.
<http://ibm.com/wikipedia/resource/United_States>
<http://ibm.com/wikipedia/property/export_market>
<http://ibm.com/wikipedia/resource/Canada>.
<http://ibm.com/wikipedia/resource/United_States>
<http://ibm.com/wikipedia/property/export_market>
<http://ibm.com/wikipedia/resource/China>.
<http://ibm.com/wikipedia/resource/United_States>
<http://ibm.com/wikipedia/property/neighboring_country>
<http://ibm.com/wikipedia/resource/Canada>.
<http://ibm.com/wikipedia/resource/United_States>
<http://ibm.com/wikipedia/property/neighboring_country>
<http://ibm.com/wikipedia/resource/Mexico>.
<http://ibm.com/wikipedia/resource/United_States>
<http://ibm.com/wikipedia/property/neighboring_country>
<http://ibm.com/wikipedia/resource/Cuba>.
<http://ibm.com/wikipedia/resource/Canada>
<http://ibm.com/wikipedia/property/import_source>
<http://ibm.com/wikipedia/resource/United_States>.
<http://ibm.com/wikipedia/resource/Canada>
<http://ibm.com/wikipedia/property/export_market>
<http://ibm.com/wikipedia/resource/United_States>.
<http://ibm.com/wikipedia/resource/European_Union>
<http://ibm.com/wikipedia/property/import_source>
<http://ibm.com/wikipedia/resource/China>.
<http://ibm.com/wikipedia/resource/European_Union>
<http://ibm.com/wikipedia/property/export_market>
<http://ibm.com/wikipedia/resource/United_States>.
<http://ibm.com/wikipedia/resource/China>
<http://ibm.com/wikipedia/property/import_source>
<http://ibm.com/wikipedia/resource/European_Union>.

-continued

<http://ibm.com/wikipedia/resource/China>
<http://ibm.com/wikipedia/property/export_market>
<http://ibm.com/wikipedia/resource/Hong_Kong_SAR>.

Example 1

The given training question is "Who does the United States do business with?" and the answer set is $a\_1=$'Canada', $a\_2=$'European Union', $a\_3=$'China', $a\_4=$'Mexico'. The focus F is 'United States'. The system performs a query on the above database and finds the following paths linking F to a subset of $A=\{a\_1, a\_2, a\_3, a\_4\}$:

$p\_1=$<http://ibm.com/wikipedia/property/import_source> going from F to $B\_1=\{a\_1, a\_3, a\_4\}$ $p\_2=$<http://ibm.com/wikipedia/property/export_market> going from F to $B\_2=\{a\_1, a\_2, a\_3\}$ $p\_3=$<http://ibm.com/wikipedia/property/neighboring_country> going from F to $B\_3=\{a\_1, a\_4,$ 'Cuba'$\}$ Beginning with answer subset B_1, the method 200 determines that the B_1 has a precision of 1 (i.e., relevant items in B_1/number of items in B_1=3/3) and a recall of 0.75 (relevant items in B_1/number of items in answer set=¾). Thus, following the flow chart in FIGS. 2A and 2B, the method 200 performs a union of B_1 with the other answer subsets B_2 and B_3. The method 200 determines that the union of B_1 with B_2 has accuracy score=1 with respect to A, the union of B_1 with B_3 has accuracy score=0.75 with respect to A, and the reunion of B_1 with B_2 and B_3 has accuracy score=0.889 with respect to A. The method 200 returns the answer subset pair {B_1, B_2} as it produced the highest accuracy score.

Similar, if the method 200 is repeated for answer subset B_2, the method 200 determines that the B_2 has a precision of 1 and recall is ½=0.5. Thus, the method 200 performs a union of B_2 with the other answer subsets B_1 and B_3. The method 200 determines that the union of B_2 with B_1 has accuracy score=1 with respect to A, the union of B_2 with B_3 has accuracy score=0.889 with respect to A, and the union of B_2 with B_1 and B_3 has accuracy score=0.889 with respect to A. The method 200 returns the answer subset pair {B_2, B_1} as it produced the highest accuracy score.

The method 200 can be similarly repeated for answer subset B_3. However, in some embodiments, the method 200 may skip over processing subset B_3 because neither its precision nor recall is 1, and since both B_1 and B_2 have better precision and recall than B_3, the union of B_3 with the other answer subsets B_1 and B_2 will produce a lower accuracy score than the those produced by B_1 and B_2. For instance, in some embodiments, the method 200 may be configured to rank the plurality of answer subsets based on the precision and the recall of the answer subsets in comparison to the answer set to the training question, and perform the individual answer subset analysis (i.e., the for loop in FIGS. 2A and 2B) on the highest or higher ranked answer subset(s), and not on low ranked answer subset(s).

Example 2

The given training question is "What neighboring countries does the United States import from?" and the answer set is $a\_1=$'Canada', $a\_2=$'Mexico'. The focus F is 'United States'. The system performs a query on the above database and finds the following paths linking F to a subset of A={a_1, a_2, a_3, a_4}:

p_1=<http://ibm.com/wikipedia/property/import-source> going from F to B_1={a_1, a_2, 'China'} p_2=<http://ibm.com/wikipedia/property/export-market> going from F to B_2={a_1, 'China', 'European Union'} p_3=<http://ibm.com/wikipedia/property/neighboring_country> going from F to B_3={a_1, a_2, 'Cuba'}

Beginning with answer subset B_1, the method 200 determines that the B_1 has a precision of $\frac{2}{3}=0.667$ and a recall of 1. Thus, following the flow chart in FIGS. 2A and 2B, the method 200 performs an intersection of B_1 with the other answer subsets B_2 and B_3. The method 200 determines that the intersection of B_1 with B_2 has accuracy score=0.5 with respect to A, the intersection of B_1 with B_3 has accuracy score=1 with respect to A, and the intersection of B_1 and B_2 and B_3 has accuracy score=0.667 with respect to A. The method 200 returns the answer subset pair {B_1, B_3} as it produced the highest accuracy score.

Similar, if the method 200 is repeated for answer subset B_3, the method 200 determines that the B_3 has a precision of $\frac{2}{3}=0.667$ and a recall of 1. Thus, the method 200 performs an intersection of B_3 with the other answer subsets B_1 and B_2. The method 200 determines that the intersection of B_3 with B_1 has accuracy score=1 with respect to A, the intersection of B_3 with B_2 has accuracy score=0.667 with respect to A, and the intersection of B_1 and B_2 and B_3 has accuracy score=0.667 with respect to A. The method 200 returns the answer subset pair {B_3, B_1} as it produced the highest accuracy score.

Similar to above, the method 200 may repeat the process answer subset B_2 or may skip over answer subset B_2 because both B_1 and B_3 have better precision and recall than B_2 and thus would yield higher accuracy scores.

Figure 3:
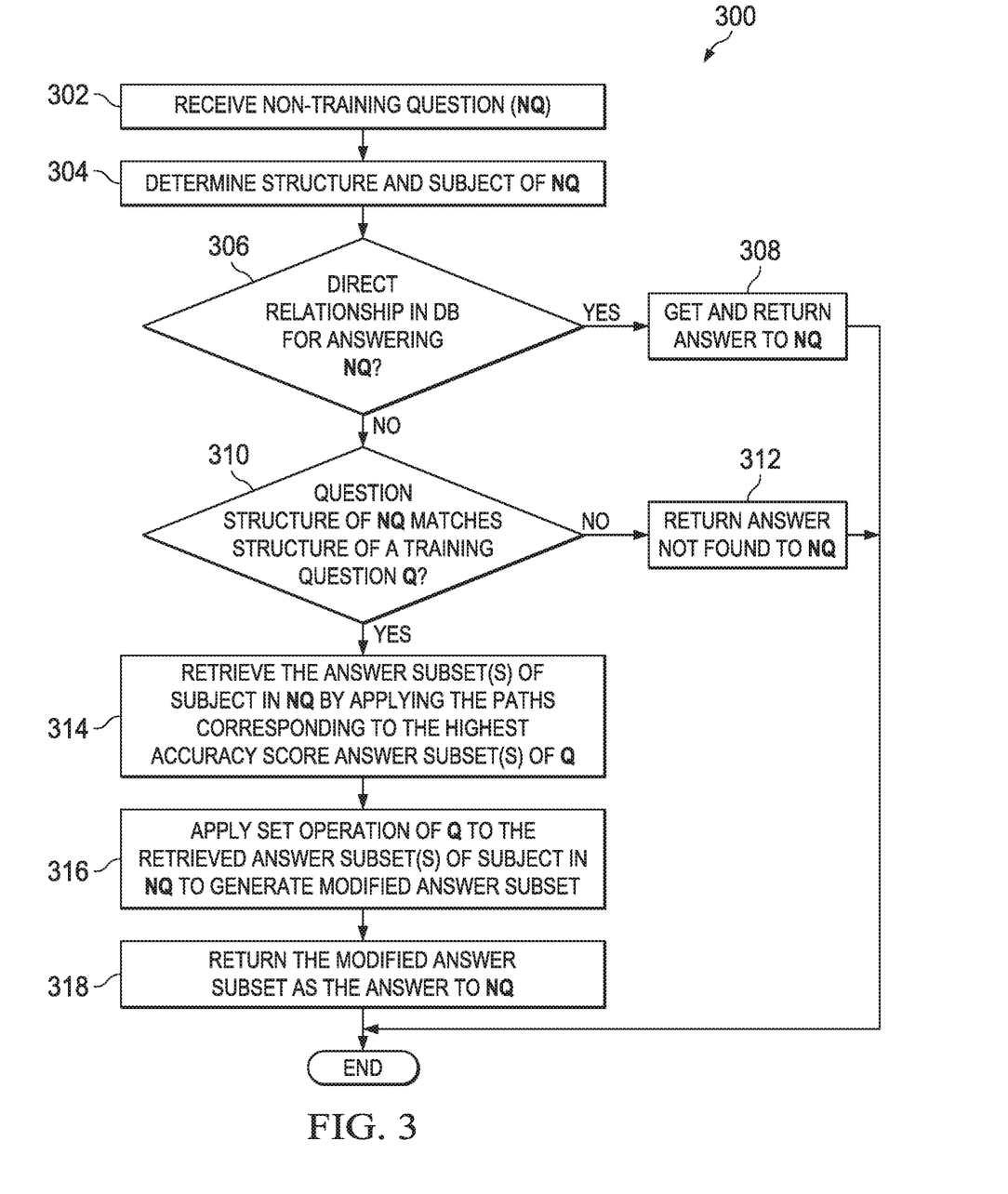
FIG. 3 is a flowchart of a computer-implemented method for providing an answer to a non-training question according to an embodiment of the present disclosure.

Referring now to FIG. 3, a flowchart of a computer-implemented method 300 for providing an answer to a non-training question is presented according to an embodiment of the present disclosure. The computer-implemented method 300 begins by receiving a non-training question (NQ). A non-training question is a question that is not used to train the system as described in FIG. 1, and FIGS. 2A and 2B. At step 304, the method 300 parses the non-training question to determine its structure and focus/subject. Based on its structure, the method 300 at step 306 determines if there is a direct relationship/path established in the database for answering the non-training question, and if so, the method 300 at step 308 retrieves the answer by following the path and returns the answer to retrieved answer, with the method 300 terminating thereafter.

However, if at step 306, no direct relationship exists in the database for answering the non-training question, the method 300 at step 310 determines if the structure of the non-training question matches the structure of a training question that the system has been trained on. In some embodiments, step 310 may be combined with step 306. If no question structure match is found, the process will return an indication that no matching question structure was found to indicate that an answer cannot be determined, with the method 300 terminating thereafter. In such cases, the non-training question may be used to further train the system as described in FIG. 1, and FIGS. 2A and 2B to improve the question and answer relationships.

If at step 310 the method 300 determines that there is a matching question structure, the method 300 at step 314 retrieves the answer subsets corresponding to the subject in the non-training question by applying the paths corresponding to the answer subsets of the matching question. At step 316, the method 300 applies the same set operations, if any, to the retrieved answer subsets corresponding to the subject in the non-training question that was applied in the matching training question to generate a modified answer subset. At step 318, the method 300 returns the elements in the modified answer subset as the answer to the non-training question, with the method 300 terminating thereafter.

Figure 4:
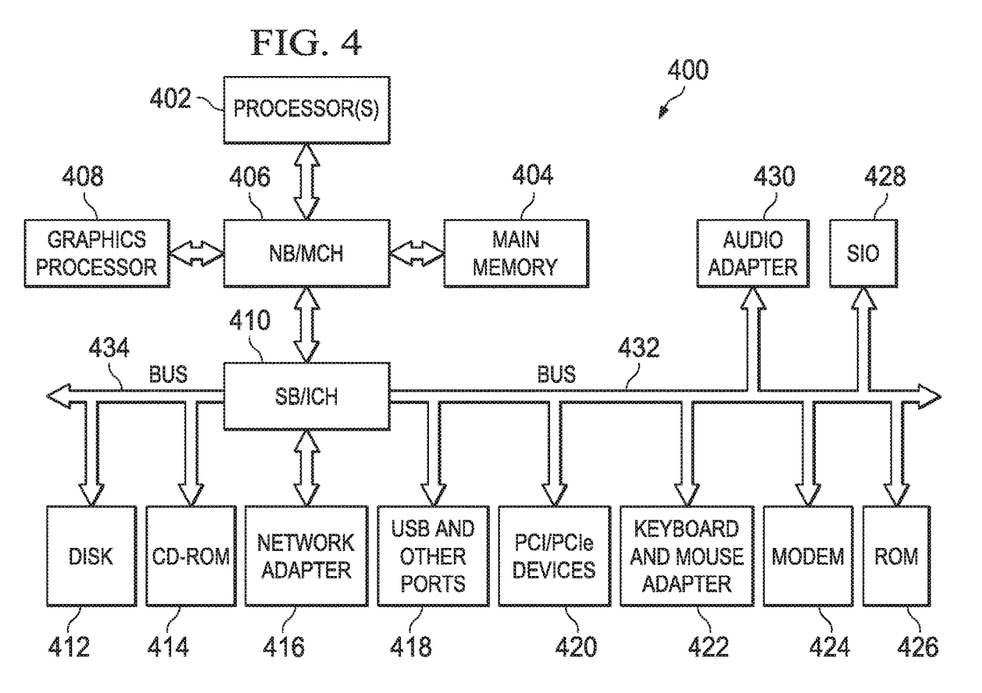
FIG. 4 shows an illustrative block diagram of an example data processing system according to an embodiment of the present disclosure.

FIG. 4 is a block diagram of an example data processing system in which aspects of the illustrative embodiments (including the computer-implemented methods described in FIGS. 1-3) may be implemented. Data processing system 400 is a simplistic example of a computer that can be applied to implement the processes of the disclosed embodiments. However, the disclosed embodiments may also be implemented in very advance systems such as an IBM® Power 750 servers or the IBM Watson® supercomputer, which employs a cluster of ninety IBM Power 750 servers, each of which uses a 3.5 GHz POWER7 eight-core processor, with four threads per core.

In the depicted example, data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, local area network (LAN) adapter 416 connects to SB/ICH 410. Audio adapter 430, keyboard and mouse adapter 422, modem 424, read only memory (ROM) 426, hard disk drive (HDD) 412, CD-ROM drive 414, universal serial bus (USB) ports and other communication ports 418, and PCI/PCIe devices 420 connect to SB/ICH 410 through bus 432 and bus 434. PCI/PCIe devices may include, for example, Ethernet adapters, add-in cards, and PC cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. Super I/O (SIO) device 428 may be connected to SB/ICH 410. In some embodiments, HDD 412 may be replaced by other forms of data storage devices including, but not limited to, solid-state drives (SSDs).

An operating system runs on processor(s) 402. The operating system coordinates and provides control of various components within the data processing system 400 in FIG. 4. Non-limiting examples of operating systems include the Advanced Interactive Executive (AIX®) operating system or the LINUX® operating system. Various applications and services may run in conjunction with the operating system. For example, in one embodiment, IBM DeepQA® software, which is designed for information retrieval that incorporates natural language processing and machine learning, is executed on data processing system 400.

Data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

Instructions for the operating system, applications, and other data are located on storage devices, such as one or more HDD 412, and may be loaded into main memory 404 for execution by processor(s) 402. In certain embodiments, HDD 412 may include a triplestore or RDF store database for the storage and retrieval of RDF triples through semantic queries. In some embodiments, additional instructions or data may be stored on one or more external devices. The processes for illustrative embodiments of the present invention may be performed by processor(s) 402 using computer usable program code, which may be located in a memory such as, for example, main memory 404, ROM 426, or in one or more peripheral devices 412 and 414.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be apparent from the foregoing that the disclosed embodiments have significant advantages over current art. As an example, the disclosed embodiments enable the answering of complex natural language questions that do not have a direct relationship established in a database without modifying the content in the database. In other words, additional RDF triples do not need to be added to the database. This improves the efficiency of the system as additional data does not need to be stored and processed, while improving the process and accuracy of providing answers to complex natural language questions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, while the present disclosure describes the use of a RDF database, the innovative approach disclosed herein may also be applicable to a Structured Query Language (SQL) relational database. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing answers to questions that do not have a direct relationship established in a database, the computer-implemented method comprising:
   receiving a training question and a training answer set to the training question;
   determining a training question structure of the training question;
   determining a training subject in the training question;
   determining a plurality of paths in a database that links the training subject to a plurality of answer subsets, wherein an answer subset comprises at least one answer in the training answer set to the training question;
   performing a relation scoring analysis on the plurality of answer subsets to determine a set operation and a combination of the answer subsets that yield a highest accuracy score when the set operation is applied to the combination of the answer subsets, wherein the relationship scoring analysis comprises determining a first combination of the answer subsets that yield a first highest accuracy score when a union set operation is applied, determining a second combination of the answer subsets that yield a second highest accuracy score when an intersection set operation is applied, comparing the first highest accuracy score to the second highest accuracy score, setting the first combination of the answer subsets and the union set operation as the set operation and the combination of the answer subsets that yield the highest accuracy score when first highest accuracy score is greater than the second highest accuracy score, and setting the second combination of the answer subsets and the intersection set operation as the set operation and the combination of the answer subsets that yield the highest accuracy score when second highest accuracy score is greater than the first highest accuracy score; and
   storing a subset of the plurality of paths corresponding to the combination of the answer subsets that yield the highest accuracy score, the set operation performed on the combination of the answer subsets that yield the highest accuracy score, and the training question structure of the training question for use in providing answers to questions.

2. The computer-implemented method of claim 1, further comprising:
   receiving a non-training question;
   determining a subject in the non-training question;
   determining a question structure of the non-training question;
   determining whether there is a direct relationship established in the database for answering the non-training question;
   determining an answer set associated with the direct relationship corresponding to the subject of the non-training question in response to determining that the direct relationship is established in the database for answering the non-training question; and
   returning the answer set as an answer to the non-training question.

3. The computer-implemented method of claim 2, further comprising:
   determining whether the question structure of the non-training question matches the training question structure of the training question in response to determining that there is no direct relationship established in the database for answering the non-training question;

retrieving, from the database, the combination of the answer subsets corresponding to the subject in the non-training question by applying the subset of the plurality of paths corresponding to the combination of the answer subsets having the highest accuracy score to the subject of the non-training question in response to determining that the question structure of the non-training question matches the training question structure of the training question;

applying the set operation on the combination of the answer subsets to generate a modified answer subset in response to the combination of the answer subsets being retrieved; and returning the modified answer subset as the answer to the non-training question.

4. The computer-implemented method of claim 1, wherein the training question structure comprises a predicate that describes a relationship between the training subject and the training answer set.

5. The computer-implemented method of claim 4, wherein determining that the question structure of the non-training question matches the training question structure of the training question comprises determining that the predicate in the question structure of the non-training question is the same as or equivalent to the predicate in the training question structure of the training question.

6. The computer-implemented method of claim 1, wherein the relation scoring analysis comprises ranking the plurality of answer subsets based on a precision and a recall of the answer subsets in comparison to the answer set to the training question.

7. The computer-implemented method of claim 1, wherein the relation scoring analysis comprises:

determining whether a single answer subset from the plurality of answer subsets has a precision equal to one and a recall equal to one in comparison to the answer set to the training question; and returning the single answer subset as the answer subset and terminating the relation scoring analysis in response to determining that the single answer subset has the precision equal to one and the recall equal to one.

8. The computer-implemented method of claim 1, wherein the relation scoring analysis further comprises:

performing the union set operation on the combination of the answer subsets for the answer subsets that have a recall of less than one in comparison to the answer set to the training question.

9. The computer-implemented method of claim 1, wherein the relation scoring analysis further comprises:

performing the intersection set operation on the combination of the answer subsets for the answer subsets that have a precision of less than one in comparison to the answer set to the training question.

10. The computer-implemented method of claim 1, wherein the database comprises of resource development framework (RDF) triples and wherein the database is not modified.

11. The computer-implemented method of claim 1, wherein the combination of the answer subsets comprises two answer subsets.

12. The computer-implemented method of claim 1, wherein the accuracy score is based on a harmonic mean of a precision and a recall of the combination of the answer subsets in comparison to the training answer set to the training question.

* * * * *